(12) United States Patent
Wang et al.

(10) Patent No.: US 9,297,953 B2
(45) Date of Patent: Mar. 29, 2016

(54) GRADED REFRACTIVE INDEX BENDING-RESISTANT MULTIMODE OPTICAL FIBER

(71) Applicant: EverPro Technologies Company Ltd., Wuhan, Hubei (CN)

(72) Inventors: Song Wang, Hubei (CN); Zhipan Zhou, Hubei (CN); Yongtao Liu, Hubei (CN); Jin Xu, Hubei (CN); Mingfeng Fan, Hubei (CN); Shuqiang Zhang, Hubei (CN); Wei Wang, Hubei (CN)

(73) Assignee: EVERPRO TECHNOLOGIES COMPANY LTD., Wuhan, Hubei (CN)

(*) Notice: Subject to any disclaimer, the term of this patent is extended or adjusted under 35 U.S.C. 154(b) by 0 days.

(21) Appl. No.: 14/550,493

(22) Filed: Nov. 21, 2014

(65) Prior Publication Data
US 2015/0104140 A1 Apr. 16, 2015

(30) Foreign Application Priority Data
May 28, 2012 (CN) .......................... 2012 1 0167792

(51) Int. Cl.
*G02B 6/028* (2006.01)
*G02B 6/036* (2006.01)

(52) U.S. Cl.
CPC ............ *G02B 6/0281* (2013.01); *G02B 6/0288* (2013.01); *G02B 6/03644* (2013.01)

(58) Field of Classification Search
None
See application file for complete search history.

(56) References Cited

U.S. PATENT DOCUMENTS

| 2009/0154888 A1* | 6/2009 | Abbott et al. ................. 385/124 |
| 2011/0044596 A1* | 2/2011 | Zhang et al. .................. 385/124 |
| 2015/0117827 A1* | 4/2015 | Wang et al. .......... G02B 6/0281 385/124 |

FOREIGN PATENT DOCUMENTS

| CN | 101634728 A | 1/2010 |
| CN | 101738681 A | 6/2010 |
| CN | 101907738 A | 12/2010 |
| CN | 102692675 A | 9/2012 |
| JP | 2004038006 A | 2/2004 |

OTHER PUBLICATIONS

English version of international preliminary report on patentability for PCT/CN2013/074668, dated Dec. 2, 2014.*

(Continued)

*Primary Examiner* — Mike Stahl
(74) *Attorney, Agent, or Firm* — Tim Tingkang Xia, Esq.; Locke Lord LLP

(57) ABSTRACT

A graded refractive index bending-resistant multimode optical fiber includes a core layer and claddings. The core layer has a radius in a range of 20-50 μm; refractive indexes being a graded refractive index distribution with a distribution exponent α in a range of 1.89-1.97; and a maximum relative refractive index difference (RRID) Δ1% max in a range of 0.9%-2.72%. The claddings has an inner cladding surrounding the core layer, an intermediate cladding surrounding the inner cladding and an outer cladding surrounding the inner cladding. The inner cladding has a radius in a range of 22-57 μm, and an RRID Δ2% in a range of −0.02%-0.02%. The intermediate cladding is a pure quartz glass layer, and has a radius in a range of 32-60 μm, and an RRID Δ3% in a range of −0.01%-0.01%.

17 Claims, 2 Drawing Sheets

(56) References Cited

OTHER PUBLICATIONS

State Intellectual Property Office of the P.R.C, "First Office Action for CN2012101677922", China, Mar. 5, 2013.

State Intellectual Property Office of the P.R.C, "Second Office Action for CN2012101677922", China, Nov. 13, 2013.

State Intellectual Property Office of the P.R. China, International Search Report for PCT/CN2013/074668, China, Aug. 1, 2013.

* cited by examiner

GRADED REFRACTIVE INDEX BENDING-RESISTANT MULTIMODE OPTICAL FIBER

CROSS-REFERENCE TO RELATED APPLICATIONS

This application is a continuation application of International Patent Application No. PCT/CN2013/074668, filed Apr. 25, 2013, which itself claims the priority to Chinese Patent Application No. 201210167792.2, filed May 28, 2012 in the State Intellectual Property Office of P.R. China, which are hereby incorporated herein in their entireties by reference.

Some references, if any, which may include patents, patent applications and various publications, may be cited and discussed in the description of this invention. The citation and/or discussion of such references, if any, is provided merely to clarify the description of the present invention and is not an admission that any such reference is "prior art" to the invention described herein. All references listed, cited and/or discussed in this specification are incorporated herein by reference in their entireties and to the same extent as if each reference was individually incorporated by reference.

FIELD OF THE INVENTION

The present invention relates to the field of optical communication technologies, and more particular to an optimized graded refractive index multimode optical fiber applied to a transmission window of 1300 nm in data signal transmission, fiber optic sensing and optical devices; the optical fiber not only has excellent bending-resistant performance, but also has characteristics such as easy coupling to a light source, uniform optical power distribution, and high bandwidth in the window of 1300 nm.

BACKGROUND OF THE INVENTION

The background description provided herein is for the purpose of generally presenting the context of the present invention. The subject matter discussed in the background of the invention section should not be assumed to be prior art merely as a result of its mention in the background of the invention section. Similarly, a problem mentioned in the background of the invention section or associated with the subject matter of the background of the invention section should not be assumed to have been previously recognized in the prior art. The subject matter in the background of the invention section merely represents different approaches, which in and of themselves may also be inventions. Work of the presently named inventors, to the extent it is described in the background of the invention section, as well as aspects of the description that may not otherwise qualify as prior art at the time of filing, are neither expressly nor impliedly admitted as prior art against the present invention.

Fiber-optic communications begin with the invention and applications of multimode optical fibers. Over the past decades, although single-mode optical fibers have become the main variety demanded in the optical fiber market, the multimode optical fibers have never been replaced and have maintained a steady growth in market demands. And the reason is that many characteristics of the multimode optical fibers can just meet the use of optical signals, energy transmission, local area network (LAN) data transmission and optical devices. Currently, the cost of a multimode fiber-optic communication system is far lower than that of a single mode fiber-optic communication system, which is also one of the reasons why the multimode optical fibers are everlasting. Conventional multimode optical fibers can be classified into two categories, that is, 50 µm and 62.5 µm, according to recommended standards of IEC, ITU and other international standard organizations. In the category of 50 µm, the multimode optical fibers can be further classified by an ISO 11081 standard into four types, that is, OM1, OM2, OM3 and OM4 according to bandwidths. The transmission speed of a 50 µm multimode fiber optic system varies from 10 Mbit/s to 10 Gbit/s even 100 Gbit/s, and the maximum link distance can reach as far as 2 km, which is more than sufficient to meet application demands thereof. However, the multimode optical fibers applied to systems of 10 Gbit/s or even 100 Gbit/s are all transmitted in a window of 850 nm, owing to the invention and the reduction of cost of the VCSEL 850 nm laser. If the cost of the optical devices is reduced in the window of 1300 nm, transmission of a multimode system at a speed of 10 Gbit/s or even 100 Gbit/s in the window is entirely possible; and low loss characteristics of the optical fibers in the window may be fully used to greatly increase the transmission distance and reduce the system cost. In the past few years, long-wavelength VCSEL manufacturers have done a lot of reliability tests, and have released the test results of 1300 nm band VCSEL fabricated with a wafer bonding method as follows: a zero fault rate of a 5000-hour high-temperature accelerated aging experiments is achieved, and the mean time to failure is thirty million hours at the temperature of 25° C., and is two million hours at the temperature of 70° C.

Multimode optical fibers, especially multimode optical fibers with high transmission performance, such as OM3 or OM4 optical fibers, are widely used in the short-medium distance fiber optic network systems. When the optical fibers are used in buildings or miniaturized devices, space is limited; the optical fibers endure a high bending stress. If the optical fibers endure a great bending stress for a long term, life of the optical fibers may be reduced, and transmission performance indexes may be worsened; therefore, it is required that the optical fibers be bending-resistant, so as to meet the need of special applications. An effective way to reduce the additional bending loss of an optical fiber is to optimize the cross-sectional structure of the optical fiber, mainly to design claddings with different structures, so as to reduce the loss of optical power when the optical fiber bends.

In addition, in order to let a multimode optical fiber have a good bandwidth, the refractive index profile of the optical fiber core should be a perfect parabola. Many literatures including Patent CN183049C only focus on how to prepare a preform with an accurate refractive index profile; however, in the process of fiber drawing of the preform, due to residual stress and composition diffusion, the refractive index of the optical fiber is greatly distorted compared with the preform, thereby reducing the bandwidth of the optical fiber. Therefore, optical fiber refractive index profile distortion remains to be further addressed.

Therefore, a heretofore unaddressed need exists in the art to address the aforementioned deficiencies and inadequacies.

SUMMARY OF THE INVENTION

One of the objectives of the present invention is to provide a bending-resistant multimode optical fiber optimized in a window of 1300 nm, with high bandwidth performance, and an intact refractive index profile structure after fiber drawing.

In order to solve the technical problems in view of the deficiencies in the prior art, the technical solution of the present invention is as follows.

One aspect of the present invention includes a bending-resistant multimode optical fiber with a core layer and claddings. In one embodiment, the radius R1 of the core layer is in a range of about 20 μm to about 50 μm. The refractive indexes of the core layer are of a graded refractive index distribution, with a distribution exponent α in a range of about 1.89 to about 1.97. The maximum relative refractive index difference Δ1%max of the core layer is in a range of about 0.9% to about 2.72%. Immediately adjacent to the core layer is an inner cladding, with the radius R2 in a range of about 22 μm to about 57 μm, and the relative refractive index difference Δ2% in a range of about −0.02% to about 0.02%. Sequentially outwards from the inner cladding layer are an intermediate cladding and an outer cladding, wherein the intermediate cladding is a pure quartz glass layer, with the radius R3 in a range of about 32 μm to about 60 μm. The relative refractive index difference Δ3% is in a range of about −0.01% to about 0.01%.

In one embodiment, the radius R4 of the outer cladding is 62.5±1 μm, the relative refractive index difference Δ4% of the outer cladding is in a range of about −0.15% to about −0.35%, and the outer cladding is an F-doped quartz glass layer. In another embodiment, as shown in FIG. 3 there are two layers of outer cladding, a first outer cladding near the inner side is an F-doped quartz glass layer, the radius of the first outer cladding is in a range of about 42 μm to about 60 μm, and the relative refractive index difference $\Delta 4_1\%$ of the first outer cladding is in a range of about −0.15% to about −0.35%; and a second outer cladding is a pure quartz glass layer.

In one embodiment, the core layer and the inner cladding are F—Ge co-doped quartz glass layers, and the relative refractive index difference Δ2% of the inner cladding is less than that refractive index difference Δ1% of the core layer.

In one embodiment, the distribution exponent α of the core layer is in a range of about 1.90 to about 1.95, and a higher bandwidth can be obtained in a window of 1300 nm.

In another embodiment, the distribution exponent α of the core layer is in a range of about 1.91 to about 1.93, and a higher bandwidth can be obtained in a window of 1300 nm.

In one embodiment, the radius of the core layer is in a range of about 25 μm to about 45 μm.

In one embodiment, the numerical aperture of the optical fiber is in a range of about 0.196 to about 0.34.

In one embodiment, material composition of the F—Ge co-doped quartz glass layer is $SiO_2$—$GeO_2$—F—Cl; material composition of the F-doped quartz glass layer is $SiO_2$—F—Cl; and the fluorine-containing gas is any one or more of $C_2F_6$, $CF_4$, $SiF_4$ and $SF_6$.

In one embodiment, the outmost layer of the optical fiber is an optical fiber coating layer, the optical fiber coating layer being one or two of an acrylic resin coating layer, a silicone rubber coating layer, and a polyimide coating layer.

In certain embodiment, the optical fiber coating layer is a UV-cured silicone rubber coating layer and a high temperature resistant acrylic resin coating layer, the thickness of a single edge of the optical fiber coating layer is 60±5 μm, and the working temperature of the optical fiber is in a range of about −40° C. to about +150° C.

In one embodiment, the optical fiber coating layer is a thermally cured silicone rubber coating layer, the thickness of a single edge of the optical fiber coating layer is 20±4 μm, and the working temperature of the optical fiber is in a range of about −50° C. to about +150° C.

In one embodiment, the optical fiber coating layer is a thermally cured polyimide coating layer, the thickness of a single edge of the optical fiber coating layer is 15±3 μm, and the working temperature of the optical fiber is in a range of about −50° C. to about +400° C.

According to test requirements of IEC60793-2-10, the overfilled launch bandwidth of the optical fiber of the present invention is above 200 MHz-km at the wavelength of 850 nm, and above 600 MHz-km and up to 13000 MHz-km at the wavelength of 1300 nm.

In one embodiment, at the wavelength of 1300 nm, an added loss for two rounds of bending at a bending radius of about 7.5 mm is less than about 0.2 dB; an added loss for two rounds of bending at a bending radius of about 15 mm is less than about 0.2 dB; and an added loss for 100 rounds of bending at a bending radius of about 30 mm is less than about 0.2 dB.

One aspect of the present invention provides a method for manufacturing a multimode optical fiber including the following steps:

fixing a pure quartz lining pipe on a plasma chemistry vapor deposition (PCVD) lathe for doping and deposition;

adding a fluorine-containing gas into reactive gases of silicon tetrachloride ($SiCl_4$) and oxygen ($O_2$) to introduce fluorine (F) doping, and adding germanium tetrachloride ($GeCl_4$) into the reactive gases to introduce germanium (Ge) doping;

ionizing the reactive gases into plasma in the lining pipe with microwave, and finally depositing on the inner wall of the lining pipe in a form of glass;

depositing the inner cladding and the core layer in sequence by altering the flow of the doped gas in the mixed gas according to the doping requirements of the optical waveguide structures;

melting a depositing tube into a solid core rod with a melting lathe after depositing, and then preparing a fiber preform using RIT process with fluorine-doped quartz glass as a sleeve, or using OVD or VAD outer cladding deposition process to deposit an outer cladding surrounding the solid core rod;

drawing the fiber preform by placing in a fiber drawing tower to yield an optical fiber with a low tension; and coating on the inner and outer surface of the optical fiber two layers of UV-cured acrylic resin polymer or a single layer of thermally-cured silicone rubber or polyimide.

The present invention has, among other things, the following beneficial effects. (1). A bending-resistant multimode optical fiber optimized in a transmission window of 1300 nm is provided, with a high transmission bandwidth in the window of 1300 nm; and by enlarging the core diameter and the numerical aperture, light-absorbing and light-focusing capabilities of the optical fiber with respect to LED, VCSEL or LD are significantly improved, and coupling fault tolerance capability between light-emitting devices as the light sources and light-transmitting devices as the optical fibers is improved; the low refractive index outer cladding of the optical fiber significantly reduces macro-bending added loss and improves bending-resistant character of the optical fiber. (2). The design of particular claddings reduces distortion of the refractive index of the core layer of the optical fiber in the fiber drawing process, thereby ensuring that the optical fiber has excellent bandwidth features. (3). The transmission speed of the multimode optical fiber in the window of 1300 nm can reach 10 Gbit/s or even 100 Gbit/s. (4). The coating layer of the present invention makes the optical fiber have better high temperature endurance, and the optical fiber can be used normally in higher-temperature environments, and can work stably in different high-temperature environments for a long term.

These and other aspects of the present invention will become apparent from the following description of the preferred embodiment taken in conjunction with the following drawings, although variations and modifications therein may be effected without departing from the spirit and scope of the novel concepts of the invention.

BRIEF DESCRIPTION OF THE DRAWINGS

The accompanying drawings illustrate one or more embodiments of the invention and together with the written description, serve to explain the principles of the invention. Wherever possible, the same reference numbers are used throughout the drawings to refer to the same or like elements of an embodiment.

DETAILED DESCRIPTION OF THE INVENTION

Figure 1:
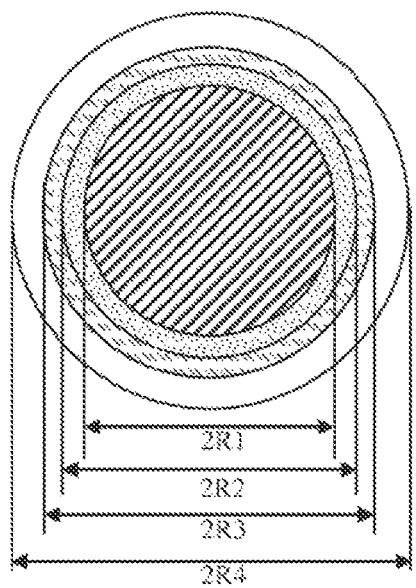
FIG. 1 is a structural diagram of a radial section according to one embodiment of the present invention.
Figure 2:
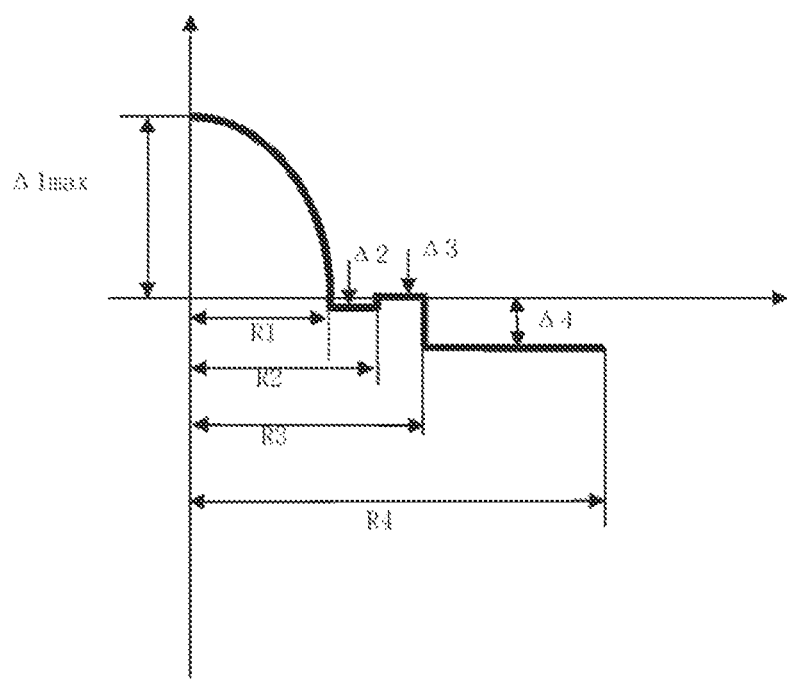
FIG. 2 is a diagram of a refractive index profile according to one embodiment of the present invention.
Figure 3:
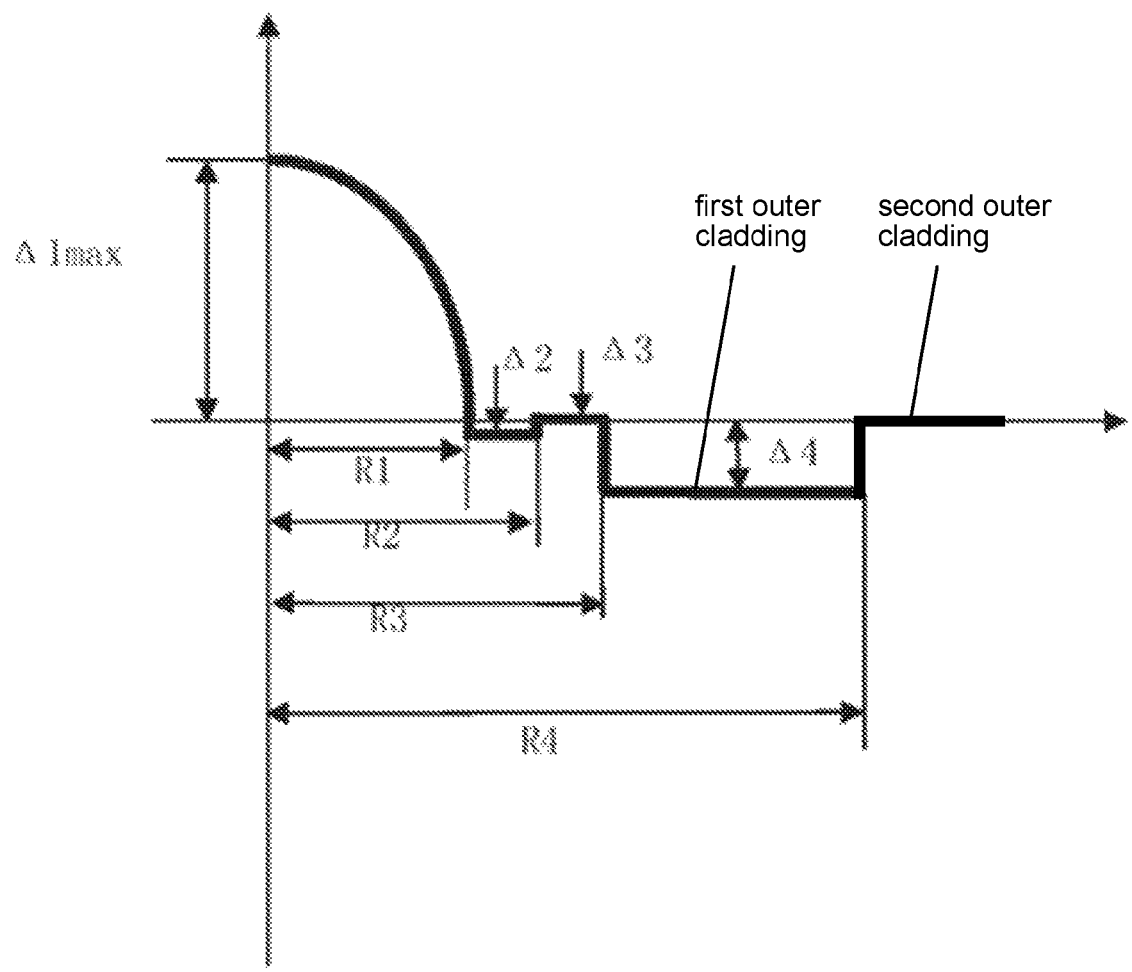
FIG. 3 is a diagram of a refractive index profile according to another embodiment of the present invention.

The invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terms used in this specification generally have their ordinary meanings in the art, within the context of the invention, and in the specific context where each term is used. Certain terms that are configured to describe the invention are discussed below, or elsewhere in the specification, to provide additional guidance to the practitioner regarding the description of the invention. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way. Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and in no way limits the scope and meaning of the invention or of any exemplified term. Likewise, the invention is not limited to various embodiments given in this specification.

It will be understood that, although the terms first, second, third etc. may be used herein to describe various elements, components, regions, layers and/or sections, these elements, components, regions, layers and/or sections should not be limited by these terms. These terms are only configured to distinguish one element, component, region, layer or section from another element, component, region, layer or section. Thus, a first element, component, region, layer or section discussed below could be termed a second element, component, region, layer or section without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", or "includes" and/or "including" or "has" and/or "having" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "quartz lining pipe" refers to a tubular base pipe, whose inner wall bears glassy oxide deposition of a PCVD chemical reaction.

As used herein, the term "sleeve" refers to a quartz glass tube meeting certain geometry and doping requirements.

As used herein, the term "core layer" refers to a central area of a cross section of an optical fiber, which is a major light guiding region of the optical fiber.

As used herein, the term "inner cladding" refers to an annular region in the cross section of the optical fiber which is adjacent to the core layer.

As used herein, the term "intermediate cladding" refers to an annular region in the cross section of the optical fiber which is adjacent to the inner cladding.

As used herein, the term "outer cladding" refers to an annular region in the cross section of the optical fiber which is adjacent to the intermediate cladding.

As used herein, the term "relative refractive index difference" is defined by $$\Delta\% = \left[\frac{(n_i^2 - n_0^2)}{2n_i^2}\right] \times 100\% \approx \frac{n_i - n_0}{n_0} \times 100\%$$

where ni and n0 are respectively a refractive index of each corresponding portion and a refractive index of pure silica quartz glass at a wavelength of 850 nm. Unless otherwise defined, ni refers to the maximal refractive index of each corresponding portion in the specification.

As used herein, the term "numerical aperture" is defined by $$NA = n_0 \times (2\Delta)^{1/2}.$$

As used herein, the term "exponential refractive index distribution profile" refers to a refractive index profile which satisfies the following exponential function, which in the form of:

$$n^2(r) = n_1^2\left[1 - 2\Delta\left(\frac{r}{a}\right)^\alpha\right] r < a$$

where $n_1$ represents the refractive index at the axis of an optical fiber; r represents the distance away from the axis of the optical fiber; a represents the radius of the core layer of the optical fiber; α represents the distribution exponent; and Δ represents the relative refractive index difference of the core layer/the cladding.

The description will be made as to the embodiments of the present invention in conjunction with the accompanying drawings. In accordance with the purposes of this invention, as embodied and broadly described herein, this invention, in one aspect, relates to a graded refractive index bending-resistant multimode optical fiber.

In one embodiment, the multimode optical fiber includes a core layer and claddings, where reference may be made to the following table for parameters of the core layer and the claddings including an inner cladding surrounding the core layer, an intermediate cladding surrounding the inner cladding and an outer cladding surrounding the inner cladding. In the following table, R1 represents the radius of the core layer, R2 represents the radius of the inner cladding, R3 represents the radius of the intermediate cladding, and R4 represents the radius of the outer cladding.

|  | 1 | 2 | 3 | 4 | 5 |
|---|---|---|---|---|---|
| Exponent α of the core layer | 1.92 | 1.90 | 1.96 | 1.95 | 1.89 |
| Δ1max (%) | 1.07 | 1.76 | 2.00 | 2.3 | 2.56 |
| Δ2 (%) | −0.01 | 0.01 | 0 | 0.01 | 0.01 |
| Δ3 (%) | −0.001 | 0.001 | 0.001 | 0.001 | 0.002 |
| Δ4 (%) | −0.22 | −0.25 | −0.32 | −0.26 | −0.33 |
| R1 (μm) | 25.0 | 31.25 | 40.0 | 27 | 43 |
| R2 (μm) | 29.1 | 35.2 | 44.0 | 29.3 | 45.7 |
| R3 (μm) | 40.3 | 50.8 | 55.5 | 39.5 | 55.9 |
| R4 (μm) | 62.5 | 62.5 | 62.5 | 62.5 | 62.5 |
| Numerical aperture | 0.210 | 0.275 | 0.293 | 0.315 | 0.332 |
| Overfilled launch bandwidth @850 nm (MHz-km) | 336 | 211 | 216 | 209 | 233 |
| Overfilled launch bandwidth @1300 nm (MHz-km) | 9806 | 3783 | 2556 | 993 | 837 |
| Material of the coating layer | Acrylic resin | Acrylic resin and silicone rubber | Polyimide | Silicone rubber | Acrylic resin |
| Thickness (μm) of a single edge of the coating layer | 60 | 60 | 15 | 23 | 60 |
| Macro-bending added loss of the optical fiber coiled into two circles with the 7.5 mm bending radius @1300 nm (dB) | 0.030 | 0.030 | 0.120 | 0.135 | 0.135 |
| Macro-bending added loss of the optical fiber coiled into two circles with the 15 mm bending radius @1300 nm (dB) | 0.005 | 0.002 | 0.130 | 0.150 | 0.166 |
| Macro-bending added loss of the optical fiber coiled into 100 circles with the 30 mm bending radius @1300 nm (dB) | 0.030 | 0.020 | 0.128 | 0.123 | 0.130 |

From comparison tests, compared with the conventional multimode optical fiber of the same type, the bending loss of the bending-resistant multimode optical fiber designed and manufactured with the solution of the present invention is significantly reduced under various test conditions.

Meanwhile, the F—Ge co-doped first inner cladding designed according to the present invention can significantly endure additional stress in the process of the preform drawing into the fibers during the optical fiber manufacturing, so as to reduce distortion of the parabola of the core layer of the optical fiber; in this way, the multimode optical fiber manufactured with the design solution of the present invention has a high bandwidth, and an overfilled launch bandwidth thereof is above 200 MHz-km at the wavelength of 850 nm, and above 600 MHz-km and up to 13000 MHz-km at the wavelength of 1300 nm.

Tests on the macro-bending added loss and overfilled launch bandwidth of the embodiments are described as follows.

The macro-bending added loss is obtained through tests according to the method of FOTP-62 (IEC 60793-1-47), the optical fiber under test is coiled into n circles according to a certain diameter (such as 15 mm, 20 mm, and 30 mm), then change of the optical power before and after coiling is tested after the circles are released, and the change is considered as the macro-bending added loss of the optical fiber. The test is carried out under an Encircled Flux light overfilled launch condition. The Encircled Flux light overfilled launch condition can be obtained as follows. A common multimode fiber with a length of 2 meters and a core layer diameter of 50 μm is spliced to a front end of an optical fiber to be tested; coiled a circle of a diameter of 25 mm in the middle of the optical fiber; and when a overfilled launch light is launched into the multimode fiber, the fiber to be tested is launched with Encircled Flux light. The overfilled launch bandwidth is measured according to the method of FOTP-204 under the condition of overfilled launch.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A graded refractive index bending-resistant multimode optical fiber, comprising:
   a core layer; and
   claddings surrounding the core layer,
   wherein the core layer has a radius in a range of about 20 μm to about 50 μm; refractive indexes being of a graded refractive index distribution with a distribution exponent α in a range of about 1.89 to about 1.97; and a maximum relative refractive index difference Δ1% max in a range of about 0.9% to about 2.72%;
   wherein the claddings surrounding the core layer comprises an inner cladding surrounding the core layer, an intermediate cladding surrounding the inner cladding and an outer cladding surrounding the intermediate cladding;
   wherein the inner cladding has a radius in a range of about 22 μm to about 57 μm, and a relative refractive index difference Δ2% in a range of about −0.02% to about 0.02%;
   wherein the intermediate cladding is a pure quartz glass layer, and has a radius in a range of about 32 μm to about 60 μm,
   wherein the graded refractive index distribution with the distribution exponent α is defined by:

$$n^2(r) = n_c^2\left[1 - 2\Delta 1\left(\frac{r}{a}\right)^\alpha\right] \quad r < a$$

where $n_c$ represents a refractive index at the axis of an optical fiber; r represents a distance away from the axis of the optical fiber; a represents a radius of the core layer of the optical fiber; α represents the distribution exponent, and Δ1 represents a relative refractive index difference of the core layer; and
   wherein the relative refractive index difference Δi is defined by:

$$\Delta i\ \% = [(n_i^2 - n_0^2)/2n_i^2] \times 100\% \approx \frac{n_i - n_0}{n_0} \times 100\%$$

where $n_i$ and $n_0$ are respectively a refractive index of a corresponding portion i and a refractive index of pure silica quartz glass at a wavelength of 850 nm.

2. The graded refractive index bending-resistant multimode optical fiber according to claim 1, wherein the radius of the outer cladding is 62.5±1 μm, a relative refractive index difference Δ4% of the outer cladding is in a range of about −0.15% to about −0.35%, and the outer cladding is an F-doped quartz glass layer.

3. The graded refractive index bending-resistant multimode optical fiber according to claim 2, wherein the core layer and the inner cladding are F—Ge co-doped quartz glass layers, and the relative refractive index difference Δ2% of the inner cladding is smaller than the refractive index difference Δ1% of the core layer.

4. The graded refractive index bending-resistant multimode optical fiber according to claim 2, wherein the distribution exponent α of the core layer is in a range of about 1.91 to about 1.95.

5. The graded refractive index bending-resistant multimode optical fiber according to claim 2, wherein the radius of the core layer is in a range of about 25 μm to about 45 μm.

6. The graded refractive index bending-resistant multimode optical fiber according to claim 5, wherein the numerical aperture of the optical fiber is in a range of about 0.196 to about 0.34, wherein the numerical aperture is defined by:

$$NA = n_0 \times (2\Delta 1)^{1/2}.$$

7. The graded refractive index bending-resistant multimode optical fiber according to claim 2, wherein the outmost layer of the optical fiber is an optical fiber coating layer, the optical fiber coating layer being one or two kinds of an acrylic resin coating layer, a silicone rubber coating layer, and a polyimide coating layer.

8. The graded refractive index bending-resistant multimode optical fiber according to claim 2, wherein an overfilled launch bandwidth is above 200 MHz-km at the wavelength of 850 nm, and above 600 MHz-km at the wavelength of 1300 nm.

9. The graded refractive index bending-resistant multimode optical fiber according to claim 2, wherein at the wavelength of 1300 nm, an added loss for two rounds of bending at a bending radius of about 7.5 mm is less than about 0.2 dB; an added loss for two rounds of bending at a bending radius of about 15 mm is less than about 0.2 dB; and an added loss for 100 rounds of bending at a bending radius of about 30 mm is less than about 0.2 dB.

10. The graded refractive index bending-resistant multimode optical fiber according to claim 1, wherein the outer cladding has a first outer cladding and a second outer cladding, the first outer cladding on the inner side is an F-doped quartz glass layer, the radius of the first outer cladding is in a range of about 42 μm to about 60 μm, and the relative refractive index difference $\Delta 4_1\%$ of the first outer cladding is in a range of about −0.15% to about −0.35%; and the second outer cladding is a pure quartz glass layer.

11. The graded refractive index bending-resistant multimode optical fiber according to claim 10, wherein the core layer and the inner cladding are F—Ge co-doped quartz glass layers, and the relative refractive index difference Δ2% of the inner cladding is smaller than the refractive index difference Δ1% of the core layer.

12. The graded refractive index bending-resistant multimode optical fiber according to claim 10, wherein the distribution exponent α of the core layer is in a range of about 1.91 to about 1.95.

13. The graded refractive index bending-resistant multimode optical fiber according to claim 10, wherein the radius of the core layer is in a range of about 25 μm to about 45 μm.

14. The graded refractive index bending-resistant multimode optical fiber according to claim 13, wherein the numerical aperture of the optical fiber is in a range of about 0.196 to about 0.34, wherein the numerical aperture is defined by:

$$NA = n_0 \times (2\Delta 1)^{1/2}.$$

15. The graded refractive index bending-resistant multimode optical fiber according to claim 10, wherein the outmost layer of the optical fiber is an optical fiber coating layer, the optical fiber coating layer being one or two kinds of an acrylic resin coating layer, a silicone rubber coating layer, and a polyimide coating layer.

16. The graded refractive index bending-resistant multimode optical fiber according to claim 10, wherein an overfilled launch bandwidth is above 200 MHz-km at the wavelength of 850 nm, and above 600 MHz-km at the wavelength of 1300 nm.

17. The graded refractive index bending-resistant multimode optical fiber according to claim 10, wherein at the wavelength of 1300 nm, an added loss for two rounds of bending at a bending radius of about 7.5 mm is less than about 0.2 dB; an added loss for two rounds of bending at a bending radius of about 15 mm is less than about 0.2 dB; and an added loss for 100 rounds of bending at a bending radius of about 30 mm is less than about 0.2 dB.

* * * * *